(12) United States Patent
Bauch et al.

(10) Patent No.: US 7,260,599 B2
(45) Date of Patent: Aug. 21, 2007

(54) SUPPORTING THE EXCHANGE OF DATA BY DISTRIBUTED APPLICATIONS

(75) Inventors: David James Bauch, Greenwood Village, CO (US); Warren David Ryd, Colorado Springs, CO (US); Mats Lennart Aretun, Greenwood Village, CO (US)

(73) Assignee: Hyperspace Communications, Inc., Greenwood Village, CO (US)

( * ) Notice: Subject to any disclaimer, the term of this patent is extended or adjusted under 35 U.S.C. 154(b) by 239 days.

(21) Appl. No.: 10/383,992

(22) Filed: Mar. 7, 2003

(65) Prior Publication Data

US 2004/0177359 A1    Sep. 9, 2004

(51) Int. Cl.
*G06F 15/16* (2006.01)
*G06F 9/54* (2006.01)
(52) U.S. Cl. ............... 709/202; 709/203; 709/247; 719/317; 719/328
(58) Field of Classification Search ........ 709/200–247; 719/317, 328
See application file for complete search history.

(56) References Cited

U.S. PATENT DOCUMENTS

| | | | | |
|---|---|---|---|---|
| 5,602,991 A | * | 2/1997 | Berteau ................... 709/227 |
| 5,606,493 A | * | 2/1997 | Duscher et al. ............. 700/5 |
| 5,608,870 A | * | 3/1997 | Valiant .................... 711/100 |
| 5,680,551 A | * | 10/1997 | Martino, II ............... 709/226 |
| 5,774,668 A | * | 6/1998 | Choquier et al. .......... 709/223 |
| 5,781,743 A | * | 7/1998 | Matsuno et al. ........... 709/228 |
| 5,781,787 A | * | 7/1998 | Shafer et al. ................ 712/28 |
| 5,781,910 A | * | 7/1998 | Gostanian et al. ......... 707/201 |
| 5,793,763 A | | 8/1998 | Mayes et al. |
| 5,805,823 A | * | 9/1998 | Seitz ........................ 709/236 |
| 5,864,669 A | * | 1/1999 | Osterman et al. ........... 709/203 |
| 5,873,086 A | * | 2/1999 | Fujii et al. ................ 707/10 |
| 5,875,329 A | * | 2/1999 | Shan ......................... 719/314 |
| 5,881,238 A | * | 3/1999 | Aman et al. ............... 709/226 |
| 5,960,404 A | * | 9/1999 | Chaar et al. .................. 705/8 |
| 6,104,716 A | * | 8/2000 | Crichton et al. ........... 370/401 |
| 6,182,154 B1 | * | 1/2001 | Campagnoni et al. ...... 719/315 |
| 6,195,356 B1 | | 2/2001 | Anello et al. |
| 6,289,390 B1 | * | 9/2001 | Kavner ..................... 719/310 |
| 6,321,274 B1 | * | 11/2001 | Shakib et al. .............. 719/330 |
| 6,362,836 B1 | * | 3/2002 | Shaw et al. ................ 345/744 |
| 6,434,627 B1 | | 8/2002 | Millet et al. |
| 6,643,690 B2 | * | 11/2003 | Duursma et al. ........... 709/217 |
| 6,711,606 B1 | * | 3/2004 | Leymann et al. .......... 709/203 |
| 6,754,819 B1 | * | 6/2004 | Wootten et al. ............ 713/150 |
| 6,947,965 B2 | * | 9/2005 | Glass ........................ 709/203 |
| 2002/0152268 A1 | * | 10/2002 | Kureshy et al. ........... 709/203 |

(Continued)

OTHER PUBLICATIONS

Schank, Jeffrey D. "Guide to Client-Server Applications and Architecture." SYBEX Inc. 1994, chapter 1.*

(Continued)

*Primary Examiner*—Lewis A. Bullock, Jr.
(74) *Attorney, Agent, or Firm*—Perkins Coie LLP (57) ABSTRACT

A facility for managing distributed application requests is described. The facility receives from a client for a distinguished distributed application executing in a computing system a communication to be delivered to a server for the distinguished distributed application. The facility retrieves a list of servers for the distinguished distributed application. The facility selects a server for the distinguished distributed application from the retrieved list.

16 Claims, 9 Drawing Sheets

U.S. PATENT DOCUMENTS

2002/0186698 A1   12/2002  Ceniza
2003/0115259 A1*  6/2003   Lakshmi Narayanan .... 709/203
2003/0208548 A1*  11/2003  Wydra et al. ............... 709/206

OTHER PUBLICATIONS

Rosenberry, Ward et al, "Understanding DCE." O'Reilly & Associates, Inc. 1992, Chapter 2.*

* cited by examiner

SUPPORTING THE EXCHANGE OF DATA BY DISTRIBUTED APPLICATIONS

TECHNICAL FIELD

The present invention is directed to the field of computer networking, and, more particularly, to the field of exchanging application data via networks.

BACKGROUND

An application program ("application") is a computer program that performs a specific task. A distributed application is one that executes on two or more different computer systems more or less simultaneously. Such simultaneous activity is typically coordinated via communications between these computer systems, generally via a network.

One example of a distributed application is Usenet, an application enabling large number of users to participate in conversations on specific topics. These topical discussions, called newsgroups, are comprised of textual messages. A user of the Usenet application executes a client portion of the Usenet application, called a news client or a newsreader, on the user's computer system. The news client communicates with a news server program executing on one of a large number of news server computer systems using a protocol called NNTP (Network News Transfer Protocol) in order to perform such functions as retrieving a list of newsgroups, retrieving a list of the messages in a particular newsgroup, retrieving a particular message to be displayed to the user, or posting to a newsgroup a message authored by the user.

Because messages received by the news server executing on a particular news server computer system are forwarded to most or all of the other news servers, comparable sets of messages are available on many or all of the available news servers. Typically the user configures the news client to contact the news server on a particular news server computer system by supplying the Internet address—or "IP (Internet Protocol) address"—of that news server computer system. The news client, thus configured, contacts this particular news server each time it needs to contact a news server to complete a task.

Unfortunately, for such client/server applications, the user often selects a server that is sub-optimal at the time of its selection, or that becomes sub-optimal at some future time. For example, a user may select a first news server that has a typical response time of 2 seconds, rather than a second news server unknown to the user that has a typical response time of 0.05 seconds. Similarly, a user that weeks ago selected the second news server may not manually switch to the first news server when a partial network failure raises the average response time of the second news server to 5.5 seconds.

Further, the protocols relied upon by many distributed applications to communicate between portions of the application executing on different computer systems fail to incorporate or otherwise accommodate such services as encryption and compression. Further, the few such protocols that do incorporate services such as encryption and compression incorporate particular variations of these services (e.g., 56-bit DES encryption), and make it difficult to utilize others instead (e.g., 128-bit DES encryption).

In view of the foregoing, an improved approach to facilitating the exchange of data by distributed applications that successfully automated the selection of a server, and/or that permitted the use of various different data processing techniques such as encryption and compression, would have significant utility.

DETAILED DESCRIPTION

A software facility for supporting the exchange of data by distributed applications ("the facility") is provided. In particular, the facility establishes a private application network ("PAN") comprised of private application tunnels ("PAN tunnels") for exchanging data on behalf of distributed application in a manner that optimizes the selection of application servers; provides a negotiated level of transmission services such as encryption and compression, using an extensible set of transformation modules; and is easily adapted to operate with new applications, through the use of an extensible set of modular application agents.

On client computer systems, the facility uses an extensible set of modular client agents to intercept server requests from application clients, and combines application requests destined for the closely located server computer systems for transmission to those server computer systems. On server computer systems, the facility receives bundles of one or more application requests, dispatches each application request to the corresponding application server, collects application responses from application servers, and bundles them for transmission back to the originating client computer systems. Back on the client computer systems, the facility receives bundles of application responses, and dispatch each to the corresponding application client.

Some embodiments of the facility use application routing techniques to identify an application server best suited to process application requests from each application client, using a configurable variety of routing criteria, and based upon information received from a central source, independently obtained by each client computer system, or both.

Some embodiments of the facility use an extensible set of modular agents to interface with application clients and servers, both (1) to intercept application requests sent by application clients and application responses sent by application servers for transmission through a PAN tunnel, and (2) to deliver application requests to application servers and application responses to application clients that have been received through a PAN tunnel. By adding a new agent for a new distributed application to the set of agents, the facility can be extended to operate with the new application.

Some embodiments of the facility use an extensible set of transformation modules to transform application requests and responses sent through a PAN tunnel in a way negotiated as part of establishing the PAN tunnel to provide such transmission services as encryption and compression. The negotiation of transformation techniques enables the facility to adapt the transformation techniques used to the particular circumstances of the PAN tunnel, as well as to the specific set of transformation modules installed on each computer system. Additionally, by adding a new transformation module for a new transformation technique to the set of transformation modules, the facility can be extended to utilize the new transformation technique.

In one example of the operation of the facility, a PAN client and application clients including a Simple Mail Transfer Protocol ("SMTP") client for delivering email are installed on a laptop computer system. The laptop computer system is used by a user employed by a company. The laptop computer system is usually used in the company's Chicago office, but is currently being used in a hotel room in Las Vegas via dialup connection. While the laptop is being used in this manner, the user needs to send an email having a large attachment. When a request to send the email is generated by the SMTP client, the PAN client connects to a PAN server in the Chicago office. The PAN server responds with a list of SMTP servers that are available to process the request, including an SMTP server in the Chicago office, and another in the company's Los Angeles office. The PAN client determines that, given the laptop computer system's present network connection, the SMTP server in the Los Angeles office will provide faster service. The PAN client negotiates encryption and compression techniques with the PAN server in the Los Angeles office to be used to encrypt and compress the data making up the SMTP application request. This data, encrypted and compressed in this manner, is sent from a laptop computer system to the PAN server in the Los Angeles office, where it is decrypted and decompressed, and passed to an agent for the SMTP server, which has an account with the SMTP server that enables it to connect to and authenticate with the SMTP server. The agent connects the SMTP server and relays the SMTP request, which is processed by the SMTP server, and for which an application response confirming the sending of the email is returned to the laptop computer system.

In the foregoing example, the PAN provided the following advantages: The PAN identified an application server that was best-suited to handle an application request from the client computer system. The agent used by the PAN server was able to connect to and authenticate with the application server in order to relay the request. The security of the data was ensured by the encryption of the application request by the PAN, and the request was transmitted more quickly because of the compression of the application request by the PAN.

Figure 1:
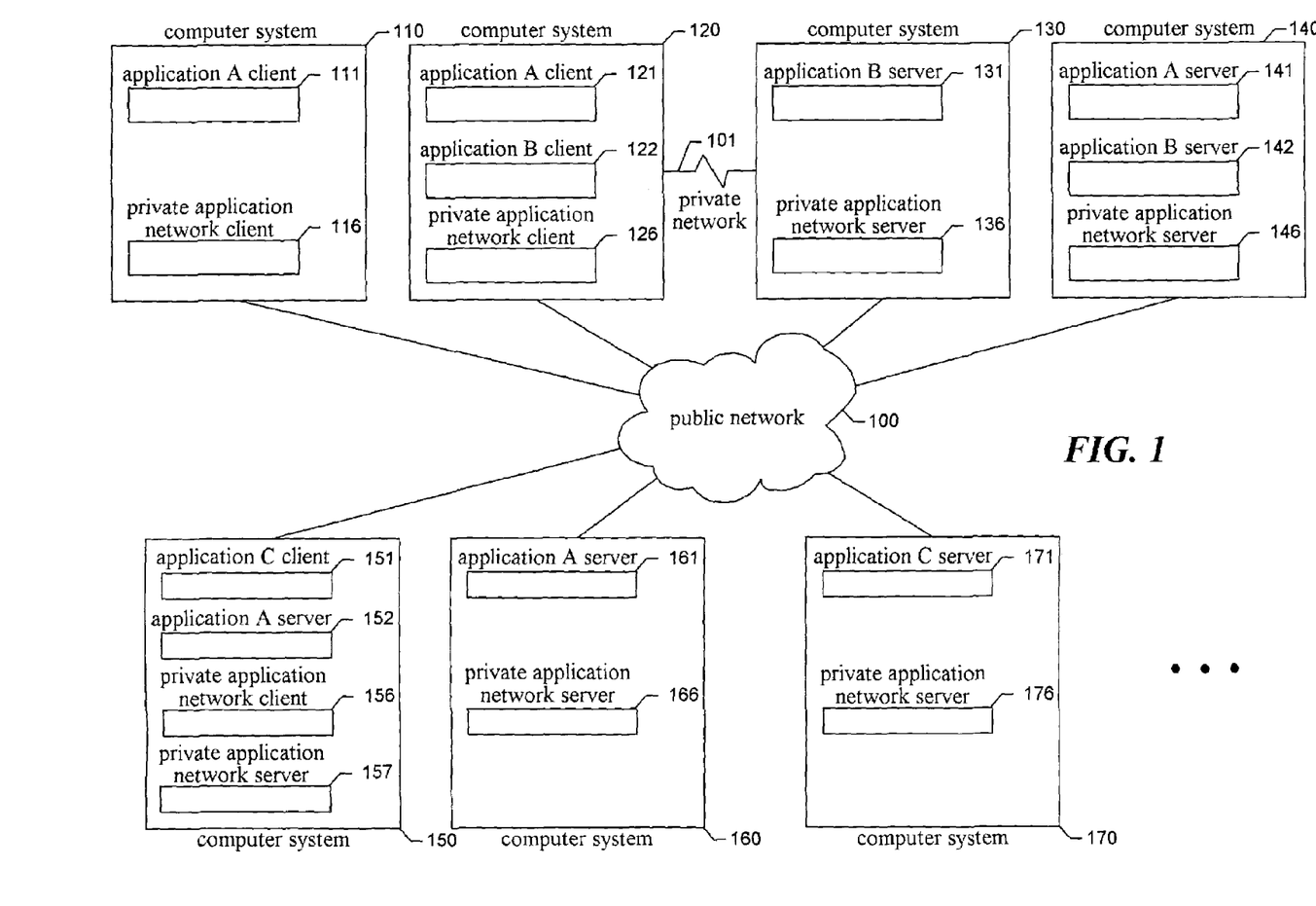
FIG. 1 is a block diagram showing a typical environment in which the facility operates.

FIG. 1 is a block diagram showing a typical environment in which the facility operates. A number of computer systems 120, 130, 140, 150, 160, and 170 are shown. Each of these computer systems may be any of a wide variety of computing devices, including desktop computer systems, dedicated server computer systems, mainframes, many-processor computational arrays, hand-held computers, corded and cordless telephones, pagers, digital organizers, etc. All of these computer systems are connected by a public network 100, such as the Internet, to which they either connect directly, or via intermediate networks, such as private networks, semi-public networks, other public networks, dial-up connections, etc. Additionally, computer systems 120 and 130 are connected by a private network 101, which may enable these computer systems to exchange data more quickly and/or more securely than they can via the public network 100. The networks used to connect these computer systems may utilize a wide variety of networking technologies, including wired, wireless, guided optical, line-of-sight optical, power network piggybacking, etc. These networks may pass traffic using a wide variety of different networking protocols.

The facility is employed to facilitate the use of distributed applications—such as client-server applications—across the network. Each client-server application includes both a client portion and a server portion, each of which may be installed on one or more computer systems. When the client portion is executing on a first computer system and needs assistance from the server portion, it communicates with the server portion executing on a different computer system. For example, the application B client 122 executing on computer system 120 may communicate with the application B server 131 executing on computer system 130. When the facility is used to facilitate communication for application B, the application B client 122 on computer system 120 issues a request that is received by the private application network client ("PAN client") 126 on computer system 120. The PAN client 126 communicates with the private application network server ("PAN server") 136 on computer system 130, which passes the request to the application B server 131 on computer system 130. The response from application B server 131 is received by the PAN server, which sends it back to the PAN client on computer system 120. The PAN client passes the response back to the application B client.

In some embodiments, PAN clients dynamically select applications servers to which to forward application requests in a manner that optimizes for such criteria as response time, cost, reliability, security, workload distribution among application servers, etc. In some embodiments, the facility sends application requests and responses via a private application network tunnel ("PAN tunnel"), within which data is passed that has been transformed in accordance with a negotiated set of processing techniques, including such processing techniques as compression and encryption algorithms. In some embodiments, application requests and/or responses for different applications may be transmitted together through a PAN tunnel.

It can be seen that a computer system may have more than one application client (e.g., computer system 120 has two application clients, for applications A and B) and that any computer system that has at least one application client has a PAN client. Similarly, it can be seen that some computer systems may have more than one application server (e.g., computer system 140 has two application servers, for applications A and B), and that each computer system that has at least one application server has a PAN server. Finally, it can be seen that some computer systems may have both application clients and application servers (e.g., computer system 150 has one of each, an application client for application C and an application server for application A), and that, in this case, the computer system has both a PAN client and a PAN server.

Figure 2:
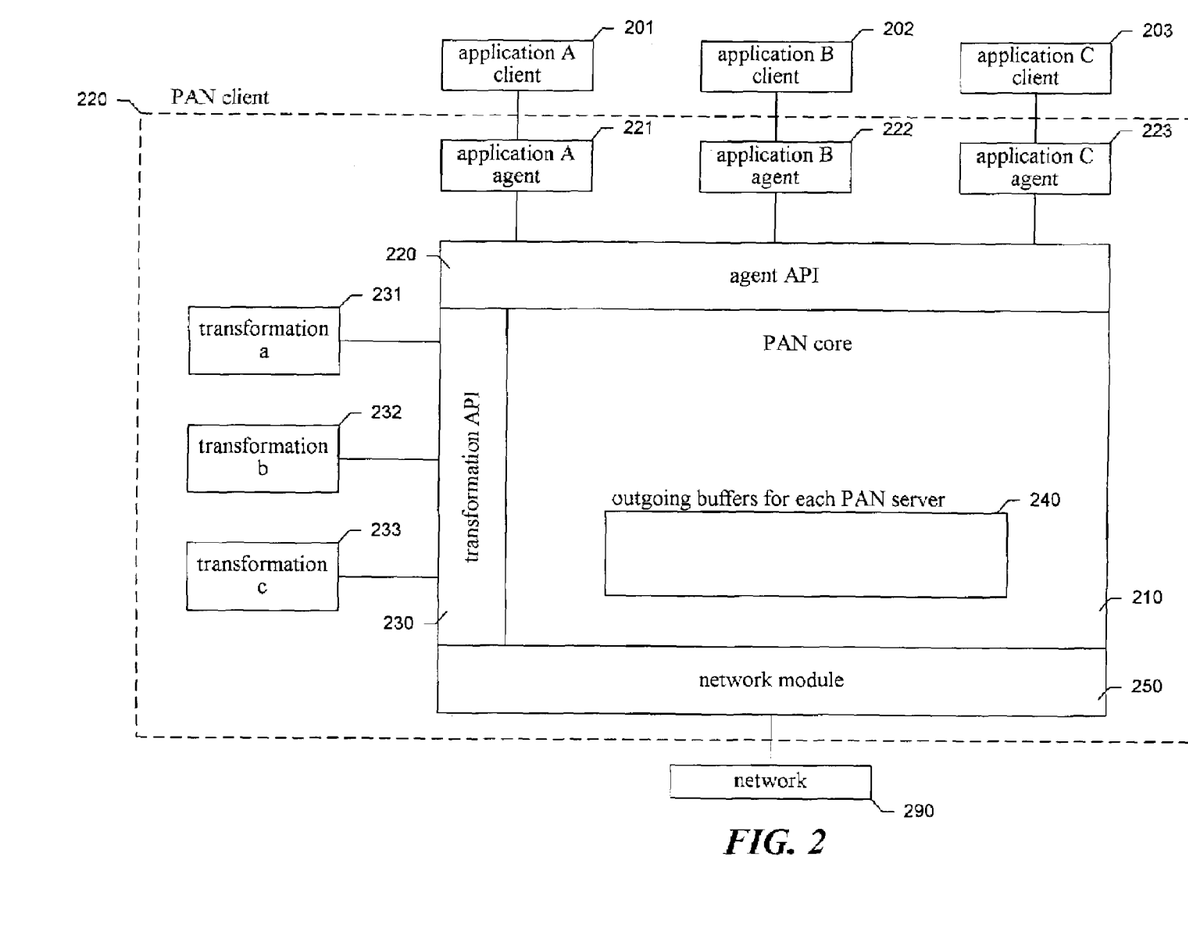
FIG. 2 is a block diagram showing architectural details of a typical private application network client.

FIG. 2 is a block diagram showing architectural details of a typical private application network client. The PAN client 220 operates to obtain or intercept application requests issued by a number of different application clients 201-203. Generally, each of the application requests can be serviced by any server for the same application. For each obtain application request, the PAN client selects a server for the same application to which to send the application request, combines the application request with any other application requests currently being sent to the PAN server executing on the same computer system as the selected application server, transforms the combined application requests in a manner agreed upon for the private application network tunnel ("tunnel") established with the PAN server on the remote computer system, and sends the combined application requests to the PAN server on the remote computer system. The PAN client performs these actions in reverse when it receives application responses from the PAN server on the remote computer system via the tunnel, ultimately passing each received application response to the appropriate application client.

An application agent is typically provided for each application client. For example, an agent for application A 221 is provided for the client for application A 201. Each agent is designed to interface with its application client to obtain or intercept application requests issued by the application client. Depending upon the design of a particular application client, this may involve such measures as: explicitly registering with the application client to receive its application requests; substituting its own virtual network address for a network address for an application server maintained by the application client; intercepting function calls by the application client to send application requests to an application server, or network traffic that results from such function calls; etc. In some cases, an application agent may be customized to coordinate its operation with a security scheme utilized by application clients and/or servers. For example, for application servers that require authentication of application clients submitting application requests, the corresponding application agent may be registered as application clients that are permitted to submit application requests to these application servers.

In each case, the agent uses an agent API to pass application requests received from application clients to a PAN core 210 within the PAN client. Use of this standardized agent API 220 enables new agents to be developed for new applications and incorporated within the PAN client, in order to adapt the PAN to exchange data for additional distributed applications. While a separate, customized agent is shown in FIG. 2 for each application client, agents may be allocated to application clients in a variety of other manners. As one example, two or more application clients can share the same agent. Further, one or more agents may be provided that are less customized to the design of the application clients with which they interact, but rather use some more standardized type of interface for interacting with such application clients.

When the PAN core receives application requests from application agents via the agent API, the PAN core determines whether a particular server for the corresponding application has already been selected by the PAN core. If not, the PAN core requests a list of eligible servers from a remote computer system that maintains such a list, from which the PAN core selects a particular server for this application. In some cases, the remote computer system exercises control over the PAN core's selection of an application server by returning only a subset of the servers for that application known to the remote computer system. Once the PAN core has identified the particular server for the corresponding application to which the application requests should be sent, the PAN core determines whether a tunnel is already open to the PAN server executing on the same computer system as that application server. If not, the PAN core establishes a tunnel with that PAN server, which involves negotiating with the remote PAN server about the types of transformations (such as compression transformations and/or encryption transformations) that are to be applied to data traveling through the new tunnel. Once a tunnel exists with the destination PAN server, the current application request is added to an outgoing buffer 240 for that PAN server. At that point, or a short time later, all of the application requests stored in the outgoing buffer for the PAN server by any of the application clients is combined and subjected to the set of transformations negotiated during the opening of the tunnel. These transformations are performed by invoking corresponding transformation modules 231-233 via a standardized API. Use of this API enables new transformation modules to be added to the facility, such as new transformation modules implementing new encryption algorithms or compression schemes. Once the application requests combined from the buffer are transformed, a network module 250 sends them via a network 290 to the destination PAN server.

When application responses are received in the network module from the network, their transformation(s) are reversed, and the individual application responses are passed to the corresponding application client via the corresponding agent.

Figure 3:
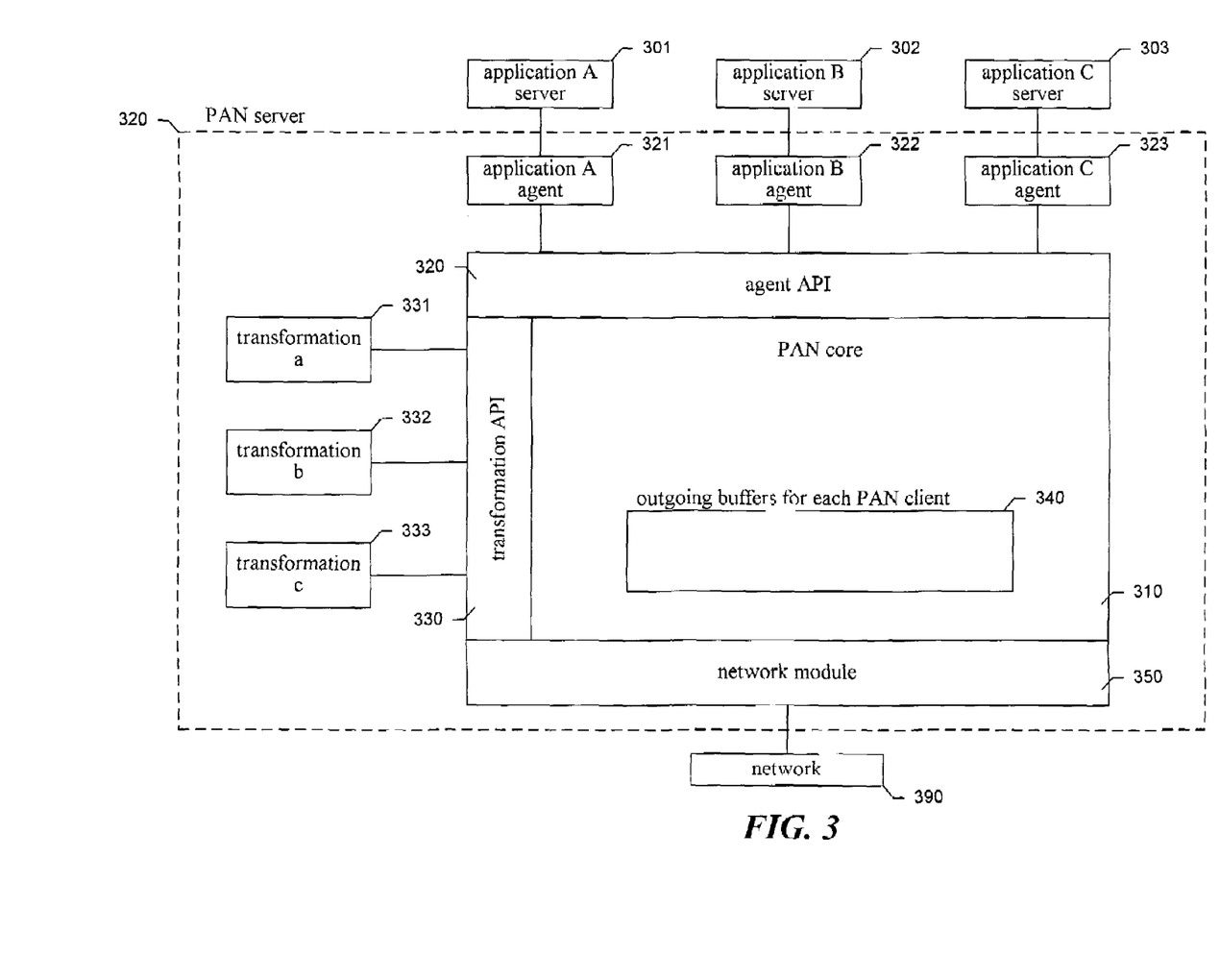
FIG. 3 is a block diagram showing architectural details of a typical private application network server.

FIG. 3 is a block diagram showing architectural details of a typical private application network server. It can be seen by comparing FIG. 3 to FIG. 2 that the architecture for a PAN server is very similar to that for a PAN client. Application requests received via a network 390 in a network module are untransformed using transformation modules 331-333 and separated into individual application requests, each of which is passed via the corresponding agent to the server for the corresponding application. When the server for the corresponding application issues an application response, it is intercepted by the agent for that application server and placed in the outgoing buffer for the corresponding PAN client. Application responses in the outgoing buffer for a PAN client are combined, subjected to the transformations negotiated for the tunnel with the PAN client, and sent to the PAN client by the network module 350 via the network 390.

Figure 4:
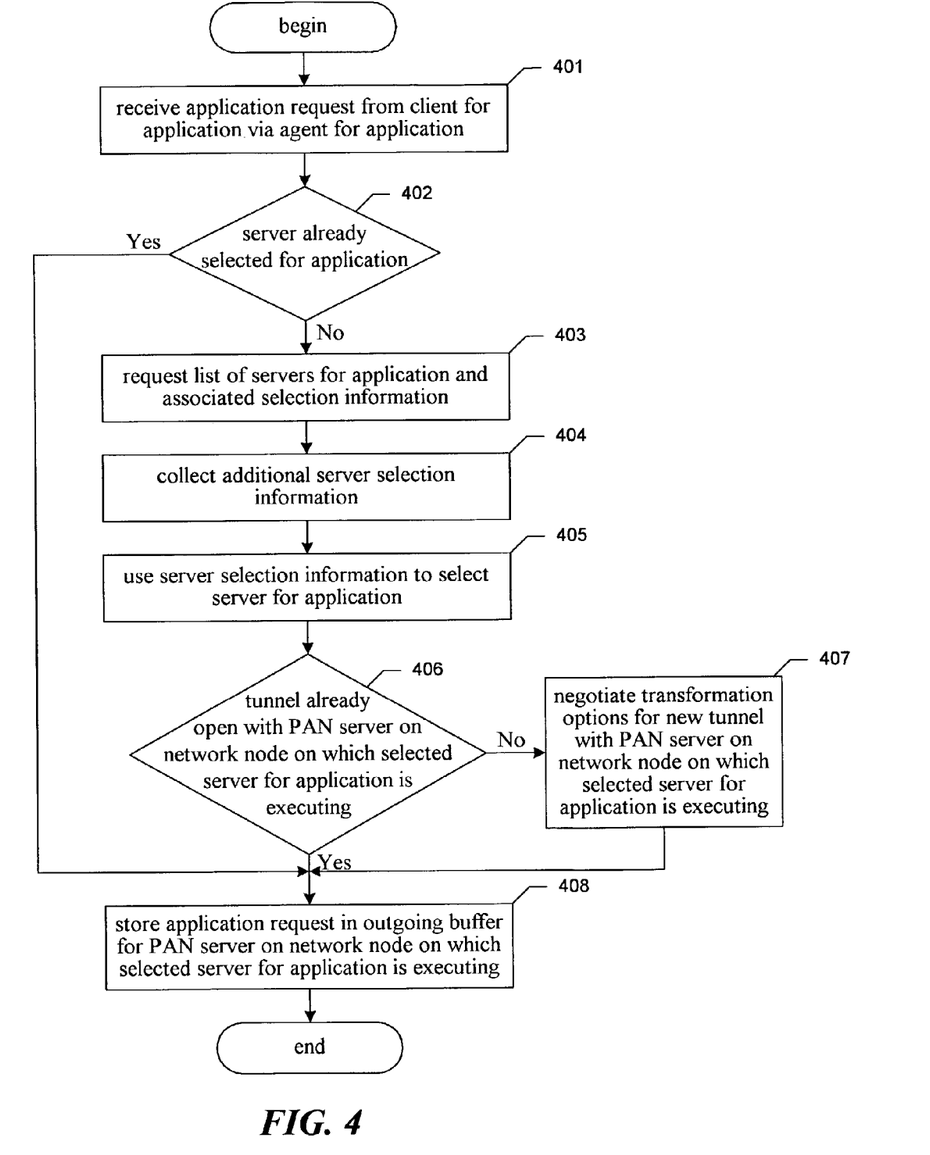
FIG. 4 is a flow diagram showing steps typically performed by the facility in a private application network client to process an application request received from an application client.

FIG. 4 is a flow diagram showing steps typically performed by the facility in a PAN client to process a received application request. In step 401, the facility receives an application request from a client for an application via an agent for that application. As discussed above, the facility typically uses an agent API to communicate between the PAN core of the PAN client and the agent for each application. In step 402, if a server is already selected for this application, then the facility continues in step 408, else the facility continues in step 403.

In step 403, the facility requests a list of servers for the application, as well as associated selection information for each of the listed servers for the application. In some embodiments, each application server in the list is identified by information such as a network address for the computer system on which the application server is executing, which may include a port number, or other information for identifying the application server within the computer system on which it is executing. The accompanying selection information may include information such as whether the application server is known to be active; recent measurements of workload or response time for the application server; an indication of a fixed cost associated with using the application server; etc. In step 404, the facility itself collects additional selection information for some or all of the application servers on the requested list. Collecting such additional information may include contacting the computer system on which each application server is executing to make such determinations as the number of network hops required to reach the computer system on which the application server is executing; the round-trip time for sending a request and eliciting a response, either from the computer system or the application server itself; etc. In step 405, the facility uses the server selection information to select one of the listed servers for the application.

In step 406, if a tunnel is already open with the PAN server on the network node on which the selected server for the application is executing, then the facility continues in step 408, else the facility continues in step 407. In step 407, the facility opens a new PAN tunnel with the PAN server on the network node on which the selected server for the application is executing, by negotiating transformation options for the new tunnel with this PAN server. A variety of factors are typically considered in the negotiation of transformation options, including the typical or actual size of the requests and responses; the typical or actual level of sensitivity of the requests and the responses; and the set of processing modules installed in both the PAN client and PAN server. As one example, the PAN client and PAN server may negotiate that a particular compression algorithm will first be applied to data that is to pass through the tunnel, and then a particular encryption algorithm is to be applied. After step 407, the facility continues in step 408.

In step 408, the facility stores the application request received in step 401 in an outgoing buffer corresponding to the PAN server on the network node on which the selected server for the application is executing for subsequent transmission to that PAN server. After step 408, these steps conclude.

Figure 5:
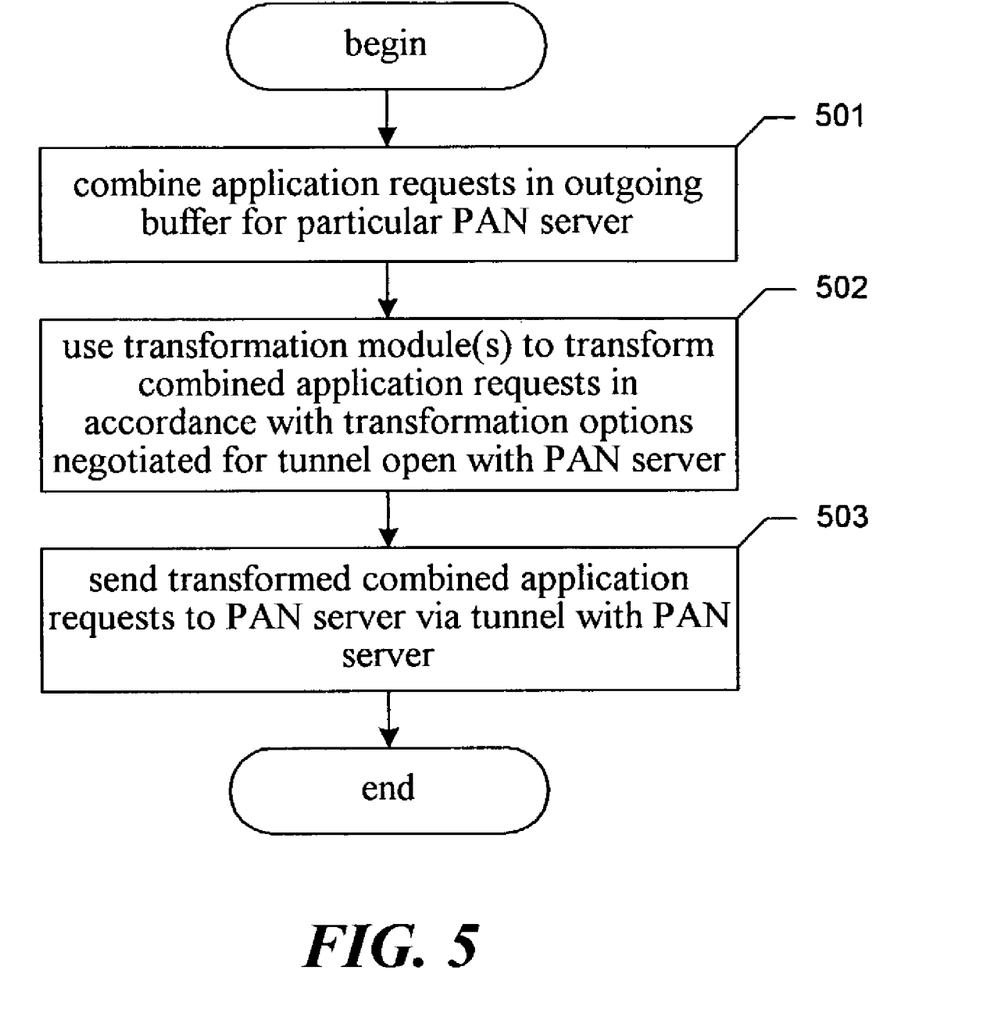
FIG. 5 is a flow diagram showing steps typically performed by the facility in order to transmit application requests accumulated for a particular private application network server in an outgoing buffer of the private application network client.

FIG. 5 is a flow diagram showing steps typically performed by the facility in order to transmit application requests accumulated for a particular PAN server in an outgoing buffer of the PAN client. In different embodiments, these steps are performed at different times, such as when a particular number of application requests have accumulated in the outgoing buffer, or a particular period of time after the first application request is stored in the outgoing buffer.

In step 501, the facility combines application requests in the outgoing buffer for a particular PAN server. In step 502, the facility uses one or more transformation modules to transform the application requests combined in step 801 in accordance with the transformation options negotiated for the tunnel that is open with the PAN server to which the application requests are to be transmitted. As noted above, the facility typically uses a standardized transformation module API in order to invoke the transformation modules needed to process the combined application requests. Where the transformation options that have been negotiated are such that first a particular compression algorithm will be applied to the data, then a particular encryption algorithm will be applied to the data, the facility in step 502 first invokes a transformation module corresponding to the compression algorithm in order to compress the combined application requests, then invokes a transformation module for the encryption algorithm in order to encrypt the compressed combined application requests. In step 503, the facility sends the application requests combined in step 501 and transformed in step 502 to the destination PAN server via the tunnel open with the PAN server. After step 503, these steps conclude.

Figure 6:
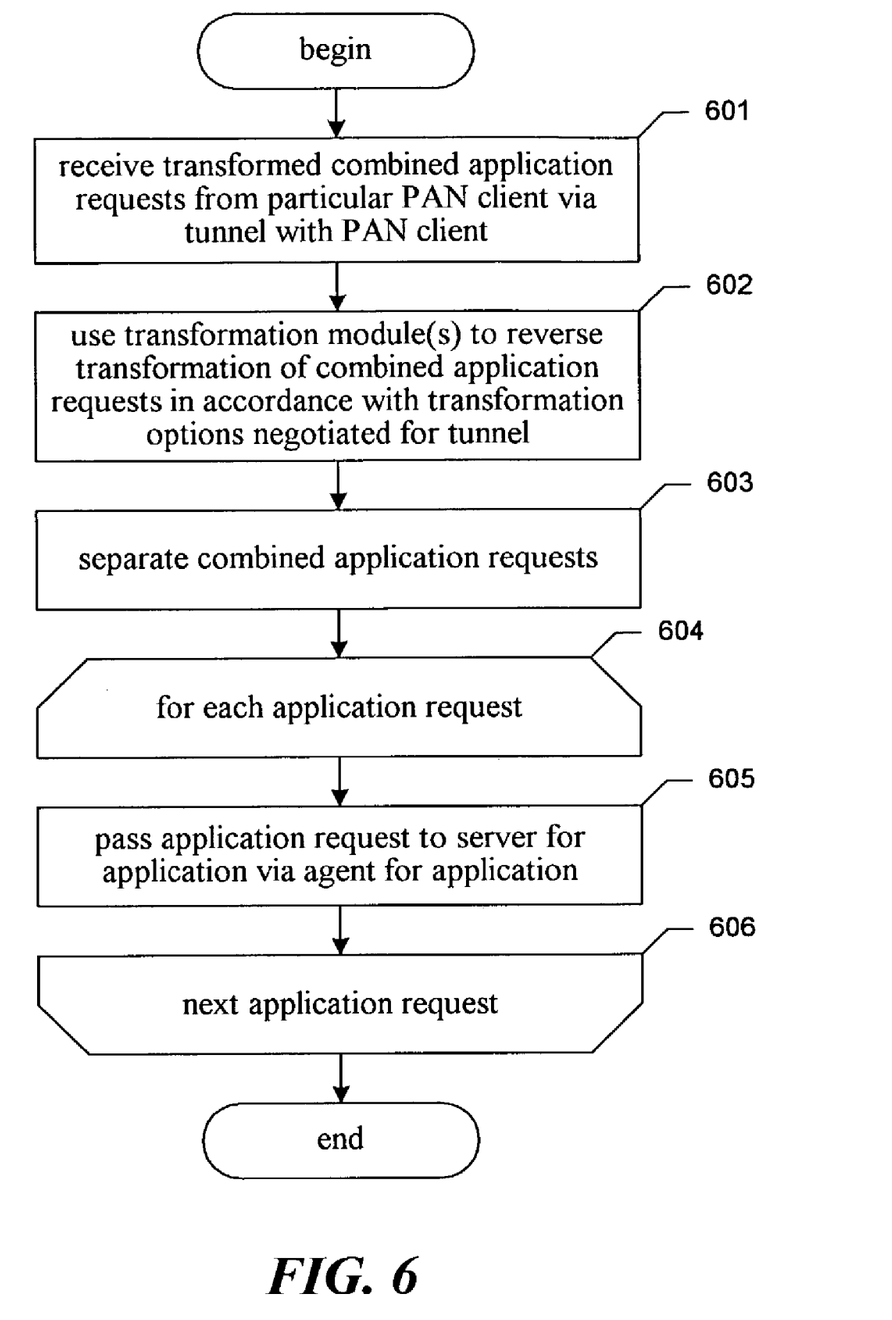
FIG. 6 is a flow diagram showing steps typically performed by the facility to process application requests received by a private application network server from a private application network client.

FIG. 6 is a flow diagram showing steps typically performed by the facility to process application requests received by a PAN server. In step 601, the facility receives combined and transformed application requests from a particular PAN client via a tunnel open between that PAN client and the current PAN server. In step 602, the facility uses one or more transformation modules to reverse the transformation of the application requests received in step 601 in accordance with the transformation options negotiated for the tunnel, in an order opposite the one in which they were applied by the PAN client. For example, if it was negotiated that the tunnel would employ a particular compression algorithm followed by a particular encryption algorithm, then in step 602 the facility first invokes the encryption module corresponding to the negotiated encryption algorithm to reverse the encryption transformation of the application requests, then uses the compression transformation module corresponding to the negotiated compression algorithm to reverse the compression transformation of the application requests. In step 603, the facility separates the combined application requests following the reversal of their transformation in step 602. In steps 604-606, the facility loops through each application request among the application requests separated in step 603. In step 605, the facility passes the application request to the server for the corresponding application via the agent for that application. In step 606, if additional application requests remain to be processed, the facility continues in step 604 process the next application request. After step 606, these steps conclude.

Figure 7:
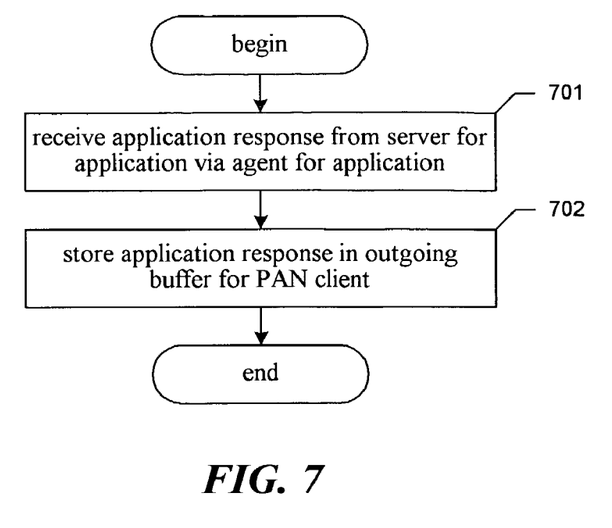
FIG. 7 is a flow diagram showing steps typically performed by the facility in a private application network server to process an application response received from application servers.

FIG. 7 is a flow diagram showing steps typically performed by the facility in a PAN server to process application responses received from application servers. In step 701, the facility receives an application response from a server for a particular application via the agent for that application. In step 702, the facility stores the application response in the outgoing buffer for the PAN client from which the corresponding application request was received for subsequent transmission to that PAN client. After step 702, these steps conclude.

Figure 8:
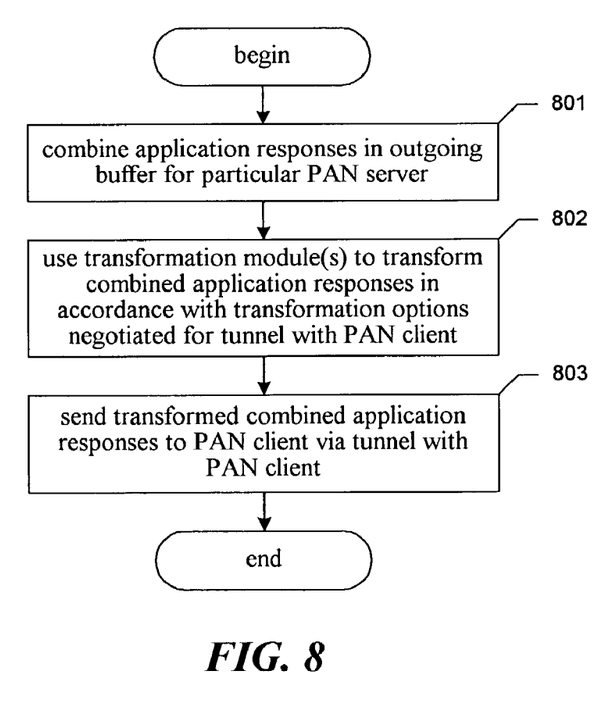
FIG. 8 is a flow diagram showing steps typically performed by the facility in order to transmit application responses accumulated in a private application network server to a destination private application network client.

FIG. 8 is a flow diagram showing steps typically performed by the facility in order to transmit application responses accumulated in a PAN server to a destination PAN client. In different embodiments, these steps are performed at different times, such as when a particular number of application responses have accumulated in the outgoing buffer, or a particular period of time after the first application response is stored in the outgoing buffer. In step 801, the facility combines application responses in the outgoing buffer for a particular PAN client. In step 802, the facility uses one or more transformation modules to transform the application responses combined in step 801 in accordance with the transformation options negotiated for the tunnel open with the PAN client. In step 803, the facility sends the application responses combined in step 801 and transformed in step 802 to the PAN client via the tunnel that is open to the PAN client. After step 803, these steps conclude.

Figure 9:
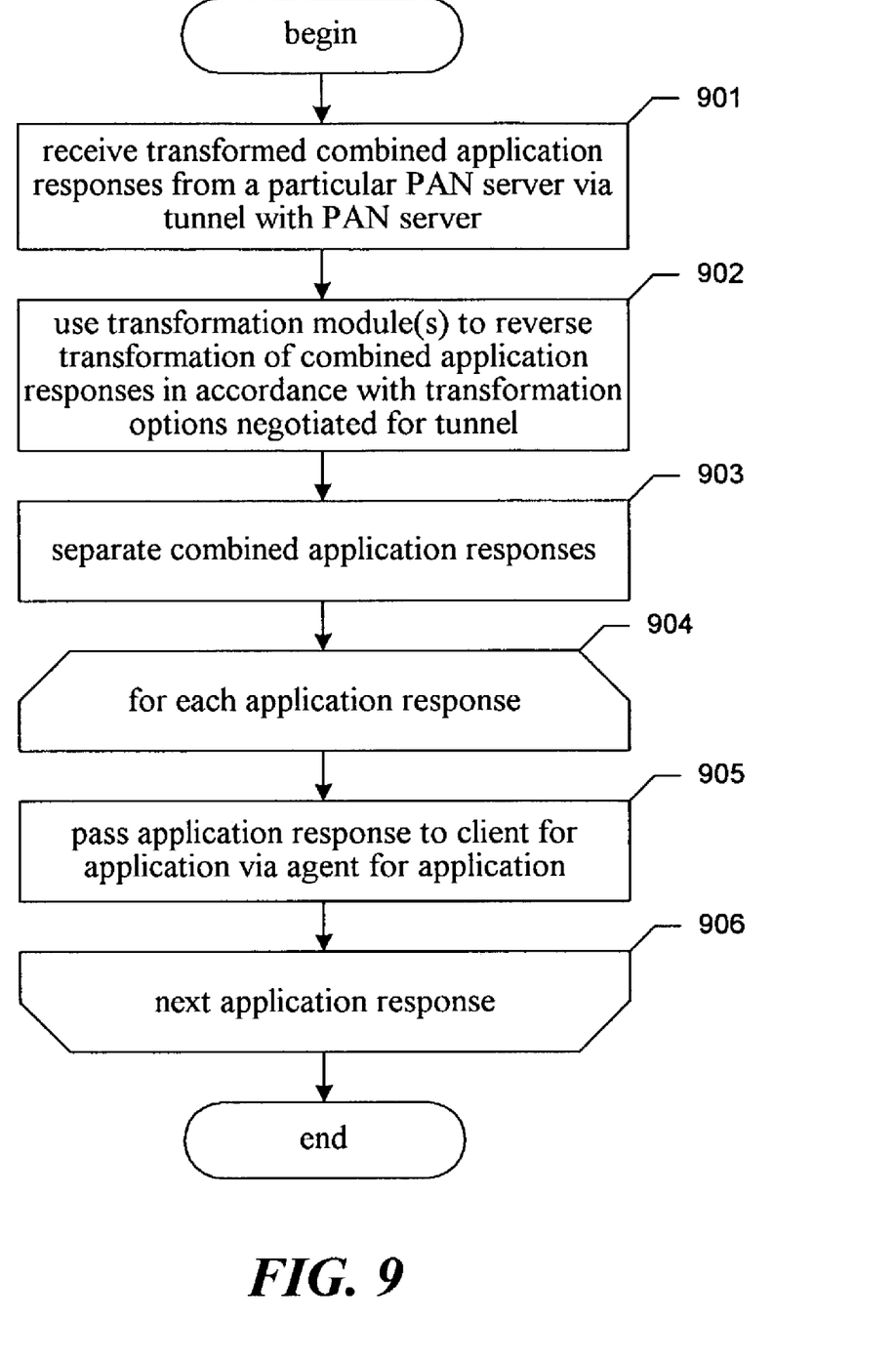
FIG. 9 is a flow diagram showing steps typically performed by the facility to process application responses received by a private application network client.

FIG. 9 is a flow diagram showing steps typically performed by the facility to process application responses received by a PAN client. In step 901, the facility receives transformed and combined application responses from a particular PAN server via the tunnel open with the PAN server. In step 902, the facility uses one or more transformation modules to reverse the transformation(s) of the combined application responses received in step 901 in accordance with the transformation options negotiated for the tunnel via which the combined application responses were received. In step 903, the facility separates the combined application responses. In steps 904-906, the facility loops through each received application response among the application responses separated in step 903. In step 905, the facility passes the application response to the client for the corresponding application via the agent for that application. In step 906, if additional application responses remain to be processed, the facility continues in step 904 to process the next application response. After step 906, these steps conclude.

Figure 10:
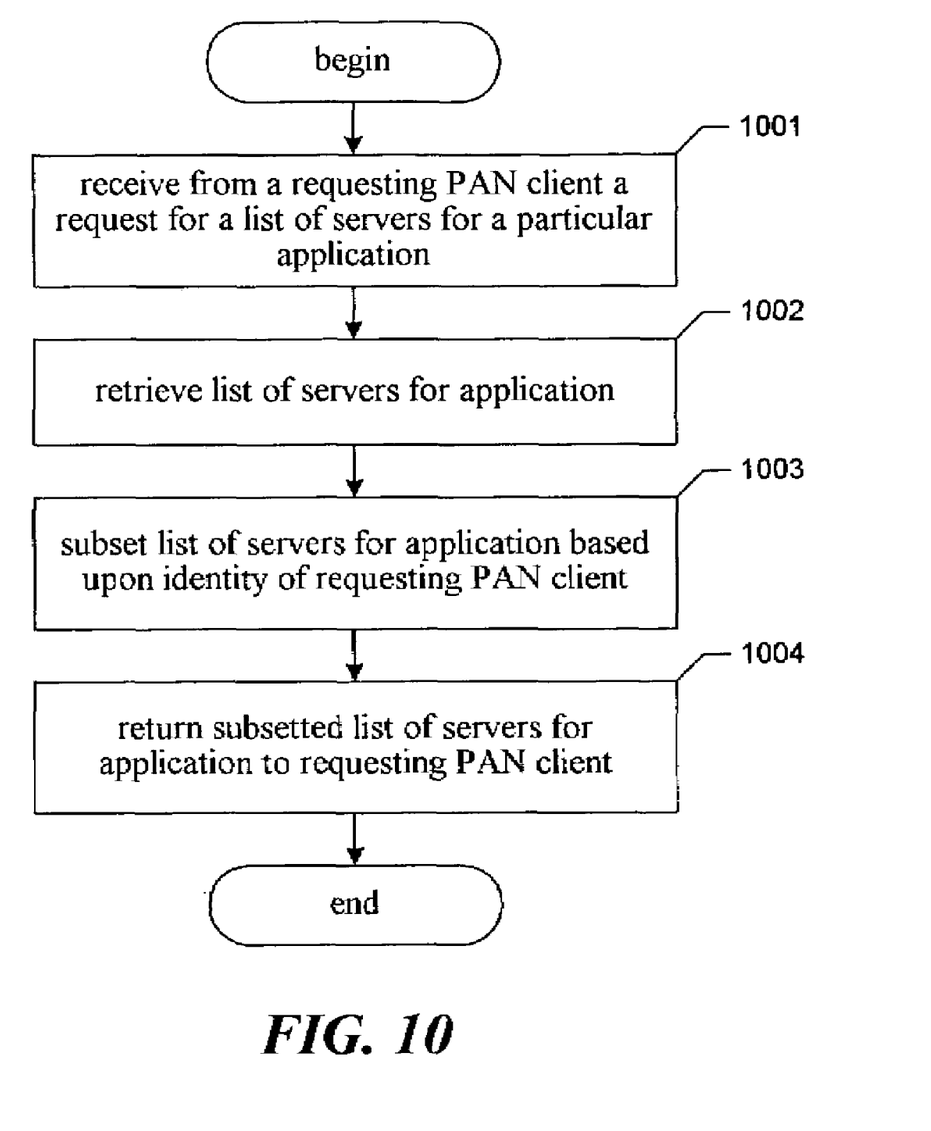
FIG. 10 is a flow diagram showing steps typically performed by the facility to process a request from a private application network client to provide a list of servers for a particular application.

FIG. 10 is a flow diagram showing steps typically performed by the facility to process a request from a PAN client to provide a list of servers for a particular application. These steps may be performed by the facility in a variety of computer systems, including within a PAN server, or in a dedicated server computer system called a PAN coordinating server. In step 1001, the facility receives from a requesting PAN client a request for a list of servers for a particular application. In step 1002, the facility retrieves a list of servers for that application. In step 1003, the facility optionally subsets the list of servers retrieved in step 1002 based upon the identity of the requesting PAN client. For example, the facility may omit to include in the subset application servers on the retrieved list that would have poor response times if used by the requesting PAN client; are too expensive for use by the requesting PAN client; are for some reason unable to support application requests that may be received from the requesting PAN client; are known to be out of operation or overloaded; etc. In step 1004, the facility returns the subset of list of servers for the application generated in step 1003 to the requesting PAN client. In some embodiments, the returned list of application servers is accompanied by information usable by the PAN client to select a particular one of the application servers, as is discussed further above. After step 1004, these steps conclude.

In order to communicate with the PAN core using the agent API, each agent implements the following methods. Each agent also provides a name and a desired start priority. The Core starts agents in priority order, enabling the priority to be used to manage interagent dependencies.

AgentLoad(): This function is used by the agent subsystem to load the agent.

AgentUnload(): This function is used by the agent subsystem to unload the agent.

Init(): The agent initialization method. Configuration is performed in this method.

Instantiate(): This method instantiates the agent. All necessary resource allocation is performed in this method such as memory allocation and thread creation. The agent thread must block and wait for a notification from the start() method in order to start executing.

Start(): This method starts the operation of the agent. If the agent implements threads, they need to be unblocked by this method.

Stop(): Stop the operation of an agent.

Destroy(): Free all resources that was claimed when the agent was instantiated.

A PAN client uses the agent API to interact with each agent as follows: The core calls the agent API to load, configure and start the agent. The series of calls in order are:
AgentLoad()
Init()
Instantiate()
Start()

When the core wants to terminate the service of the agent it will make the following calls in order:
Stop()
Destroy()
AgentUnload()

Once the agent is up and running it does what it needs to do such as binding a socket or sockets for inbound connections. Other connection types between the client agent and the client application are possible. The agent also opens a connection to the core invoking a PPQOpen() method on the core.

The client agent then waits for connections and data to arrive from the client application. When a connection arrives, the client agent sends an instruction across the tunnel that requests the server end to create a corresponding connection to the server application by invoking a PPQPost() method.

Data that arrives from the client application is passed to the core using the PPQPost() method. Data that arrives from the tunnel is retrieved by the agent using the PPQGet() method. This data is then passed to the client application through whatever connection mechanism the client agent has established.

A PAN client uses the agent API to interact with each agent in a similar manner, as follows: Each transformation module is a loadable module that gets loaded and linked at runtime. Each transformation module has a well known transformation ID that is a 32 bit integer. Each transformation can also maintain an internal state. There exists a peer to peer relationship between the transmit transformation module (on the HyperTunnel client (or server)) and receive transformation module (on the HyperTunnel server (or client)). This allows a transmitting transformation to add its own packet headers, i.e., inject its own communication protocol, onto the data stream and can thus communicate with the receiving transformation that peels off the header.

A set of methods comprising the transformation API are defined in a table for each supported transformation module. A linked list of such tables is created at startup.

tx_fn(): This is the transformation module's transmit method.

rx_fn(): This is the transformation module's receive method.

init(): This is a one time initialization method that is called by the transformation subsystem once at startup.

instantiate(): This method is called to allocate transformation resources such as state each time the transformation module is pushed onto a HyperChannel.

uninstantiate(): This method releases resources the transformation module previously has allocated in the instantiated method.

The core calls the agent API to load, configure and start the agent. The series of calls in order are:
AgentLoad()
Init()
Instantiate()
Start()

When the core wants to terminate the service of the agent it will make the following calls in order:

Stop()
Destroy()
AgentUnload()

Once the agent is up and running it does what it needs to do such as making one or more outbound connections. It may also choose to do this at a later point in time such as when data has actually arrived from the tunnel. Again, many different connection types between the server agent and the server application are possible. The agent also opens a connection to the core by invoking the PPQOpen() method on the core.

When connection instructions arrive, the server agent will make or verify the pre-existence of a connection to the server application.

When data arrives over the tunnel, the server agent will obtain this data from the core using the PPQGet() method. This data is then passed to the server application via the connection established between the server agent and the server application.

Data may also arrive from the server application. This data is passed to the core using the PPQPost() method.

The transformations are implemented via a data structure which contains memory addresses of its init, instantiate, uninstantiate, transmit and receive methods. The core creates an instance of a transformation for each channel by allocation a transformation data structure.

The core then initializes the transformation by calling its init() method. The core then instantiates the transformation by calling its instantiate() method. Data is passed to the transformation via its tx() method which returns the transformed data. Data is received from the transformation via its rx() method which reverses the transformation and returns the untransformed data.

The methods of a given transformation are invoked by the core of the tunnel. There may be several transformations that are in an ordered list. The type and number of transformations may vary between channels that are open. Each tunnel client shares a unique channel with a tunnel server. The list of transformations to be used is negotiated between the tunnel client and tunnel server during channel establishment. Data is passed to the first transformation in the list by its tx() method. The transformed data is then passed to the next transformation via its tx() method. Once all of the transformations have been processed, the core can transport the data across the tunnel. Data received from the tunnel is passed through the transformation list using the rx() methods. Once all of the transformations are reversed, the data is passed to the agents.

It will be appreciated by those skilled in the art that the above-described facility may be straightforwardly adapted or extended in various ways. For example, the facility may be used in networks of virtually any type, as well as in heterogeneous networks that employ multiple different networking technologies. Also, in addition to public networks, the facility may be used in semi-public and private networks. Further, the facility may use a variety of techniques to intercept and present application requests and responses. Additionally, the facility may be used to pass data on behalf of distributed applications that exchange data between network nodes that are of a type other than client-server applications, such as peer-to-peer applications. While the foregoing description makes reference to preferred embodiments, the scope of the invention is defined solely by the claims that follow and the elements recited therein.

We claim:

1. A method in a network for processing an application request for a distinguished application, comprising:
   in a client computer system,
      using an agent specific to the distinguished application to intercept an application request for the distinguished application issued by a client for the distinguished application executing on the client computer system;
      sending to a coordinating computer system a routing request identifying the client computer system and the distinguished application;
   in the coordinating computer system:
      receiving the routing request;
      retrieving a list of server computer systems on which servers for the distinguished application are executing;
      subsetting the retrieved list based upon the identity of the first computer system; and
      returning the subsetted list to the client computer system;
   in the client computer system:
      receiving the subsetted list;
      selecting a server computer system from the subsetted list;
      negotiating a compression method and an encryption method with the selected server computer system;
      compressing the intercepted application request using the negotiated compression method;
      encrypting the compressed application request using the negotiated encryption method;
      transmitting the compressed and encrypted application request to the selected server computer system;
   in the selected server computer system:
      receiving the compressed and encrypted application request;
      decrypting the received application request using the negotiated encryption method;
      decompressing the decrypted application request using the negotiated compression method; and
      using the agent specific to the distinguished application to pass the decrypted and decompressed application request to a server for the distinguished application executing on the selected server computer system.

2. The method of claim 1, further comprising:
   in the selected server computer system:
      using the agent specific to the distinguished application to intercept an application response generated by the distinguished application in response to the application request;
      compressing the intercepted application response using the negotiated compression method;
      encrypting the compressed application response using the negotiated encryption method;
      transmitting the compressed and encrypted application response to the client computer system;
   in the client computer system:
      receiving the compressed and encrypted application response;
      decrypting the received application response using the negotiated encryption method;
      decompressing the decrypted application response using the negotiated compression method; and
      using the agent specific to the distinguished application to pass the decrypted and decompressed application response to the client for the distinguished application.

3. A method in a computing system for configuring an application routing functionality, comprising:
installing an application routing client for forwarding to application servers requests issued by application clients; and
for each of a plurality of application clients, registering with the application routing client an agent that obtains application requests from the application client and provides obtained application requests in a standard format.

4. A computer system for performing application request routing, comprising:
a plurality of application clients;
an application routing client for forwarding application requests obtained from the application clients to corresponding application servers; and
for each application client, an agent that obtains application requests from the application client and provides the obtained application requests to the application routing client in a standard format, all of the agents being invocable by the application routing client using a standard interface.

5. The system of claim 4, further comprising a computer-readable medium encoded with an application routing data structure, the data structure comprising, for each of a plurality of network addresses at which the corresponding application servers are executing:
an indication of the network address; and
information usable by an application client to select a network address at which to contact a corresponding application server.

6. The system of claim 4, further comprising a computer-readable medium encoded with an application routing data structure, the data structure comprising, for each of a plurality of network addresses at which the corresponding application servers are executing:
an indication of the network address; and
information usable by an application client to select a network address at which to contact a corresponding application server, the information including an indication of the response time of the corresponding application server executing at the network address.

7. The system of claim 4, further comprising a computer-readable medium encoded with an application routing data structure, the data structure comprising, for each of a plurality of network addresses at which the corresponding application servers are executing:
an indication of the network address; and
information usable by an application client to select a network address at which to contact a corresponding application server, the information including an indication of the current workload level of the corresponding application server executing at the network address.

8. The system of claim 4, further comprising a computer-readable medium encoded with an application routing data structure, the data structure comprising, for each of a plurality of network addresses at which the corresponding application servers are executing:
an indication of the network address; and
information usable by an application client to select a network address at which to contact a corresponding application server, the information including an indication of a cost associated with using the corresponding application server executing at the network address.

9. The system of claim 4, further comprising a computer-readable medium encoded with an application routing data structure, the data structure comprising, for each of a plurality of network addresses at which the corresponding application servers are executing:
an indication of the network address; and
information usable by an application client to select a network address at which to contact a corresponding application server, the information including an indication of the amount of time it takes for information to be transmitted to the network address and back.

10. The system of claim 4, further comprising a computer-readable medium encoded with an application routing data structure, the data structure comprising, for each of a plurality of network addresses at which the corresponding application servers are executing:
an indication of the network address; and
information usable by an application client to select a network address at which to contact a corresponding application server, the information including an indication of whether it is possible to contact the network address.

11. The system of claim 4, further comprising a computer-readable medium encoded with an application routing data structure, the data structure comprising, for each of a plurality of network addresses at which the corresponding application servers are executing:
an indication of the network address; and
information usable by an application client to select a network address at which to contact a corresponding application server, the information including an indication of the number of network hops required to contact the network address.

12. A method in a computing system for configuring an application routing functionality to route application requests for a new application, comprising:
in an application client computer system in which an application routing client is installed, installing a first application routing agent for the new application that obtains application requests from a client for the new application and provides them to the application routing client for transmission to an application server computer system; and
in an application server computer system in which an application routing server is installed, installing a second application routing agent for the new application that obtains from the application routing server client requests sent from application client computer systems and provides them to a server for the new application.

13. A method in a computing system for configuring an application routing functionality, comprising:
installing an application routing client for forwarding to application servers application requests issued by application clients; and
registering with the application routing client a first transformation module for transforming application requests issued by application clients in a first manner to enable the application routing client to invoke the first transformation module to transform an application request in the first manner.

14. The method of claim 13, further comprising registering with the application routing client a second transformation module for transforming application requests issued by application clients in a second manner to enable the application routing client to invoke the second transformation module to transform an application request in the second manner.

15. The method of claim 13 wherein the first transformation module transforms application requests by compressing them in accordance with a selected compression algorithm.

16. The method of claim 13 wherein the first transformation module transforms application requests by encrypting them in accordance with a selected encryption algorithm.

* * * * *